United States Patent [19]
Kim et al.

[11] Patent Number: 5,774,454
[45] Date of Patent: Jun. 30, 1998

[54] COMPENSATED UPC/NPC ALGORITHM TO GUARANTEE THE QUALITY OF SERVICE IN ATM NETWORKS

[75] Inventors: Yong-Jin Kim; Il-Young Chong; Jin-Pyo Hong, all of Daejeon, Rep. of Korea

[73] Assignee: Electronics and Telecommunications Research Institute, Daejeon-shi, Rep. of Korea

[21] Appl. No.: 562,885

[22] Filed: Nov. 27, 1995

[30] Foreign Application Priority Data

Dec. 22, 1994 [KR] Rep. of Korea ............... 1994-36020

[51] Int. Cl.⁶ ........................... H04L 12/26; H04L 12/56
[52] U.S. Cl. ................ 370/232; 370/235; 370/395
[58] Field of Search ................... 370/230, 232, 370/233, 234, 235, 395; 395/200.06

[56] References Cited

U.S. PATENT DOCUMENTS

| | | | |
|---|---|---|---|
| 5,267,232 | 11/1993 | Katsube et al. | 370/230 |
| 5,434,848 | 7/1995 | Chimento, Jr. et al. | 370/232 |
| 5,497,375 | 3/1996 | Hluchyj et al. | 370/232 |
| 5,524,006 | 6/1996 | Hluchyj et al. | 370/232 |
| 5,568,468 | 10/1996 | Ogasawara et al. | 370/230 |

OTHER PUBLICATIONS

Gravey, et al.: "Cell Loss Ratio Commitments in ATM Networks"; pp. 170–174 IEEE Communications Magazine, 1994.

Gravey, Annie; "Cell Conformance and Quality of Service Guarantees in ATM Networks"; pp. 1395–1404, ITC 14 (Elsvier Science B.V.

*Primary Examiner*—Hassan Kizou
*Attorney, Agent, or Firm*—Jacobson, Price, Holman & Stern

[57] ABSTRACT

The invention relates to UPC/NPC method for guaranteeing the quality of service in an asynchronous transfer mode networks. The method comprises a first step of performing the operation of UPC/NPC for a stream of CLP=0 cells, based on PCRA algorithm (Po) for the conventional stream of CLP=0 cells. And, UPC/NPC for the stream of CLP=0+1 cells is performed by PCRA algorithm ($Po_{+1}$) for the conventional stream of CLP=0+1 cells, together with the compensation circuit using a single register of the invention. Thus, during the traffic negotiation in which two PCR are defined in ATM networks, MPP for the streams of CLP=0 cells and CLP=0+1 cells can be solved and CLR for the stream of CLP=0 cells is guaranteed.

2 Claims, 6 Drawing Sheets

FIG. 6A submitted cells: 1 1 0   1 1 0   1 1 0   1 1 0
↑ starting point $y_k$ for CLP=0:      0       0       0       0

$y_k$ for CLP=0+1: 0 2 4   0 2 4   0 2 4   0 2 4 accepted cells: 1 1 0   1 0   1 0   1 0
↑ starting point

FIG. 6B submitted cells: 1 1 0   1 1 0   1 1 0   1 1 0
↑ starting point $y_k$ for CLP=0:    0        0        0        0

$y_k$ for CLP=0+1: 0 2    1 3 2    1 3 2    1 3 2 accepted cells: 1 0    1 0    1 0    1 0
↑ starting point $T_{0+1}=3$, $\tau_{0+1}=2$        $T_0=6$, $\tau_0=0$

FIG. 7A

| | | | |
|---|---|---|---|
| submitted cells | 000 00 ↓↓↓ ↓↓ ↑ starting point | 000 00 ↓↓↓ ↓↓ | 000 00 ↓↓↓ ↓↓ |
| $y_k$ for CLP=0 | 054 21 | 054 21 | 054 21 |
| $y_k$ for CLP=0+1 | 024 57 | 024 57 | 024 57 |
| accepted cells | 011 10 ↓↓↓ ↓↓ ↑ starting point | 0 1 10 ↓ ↓ ↓↓ | 0 1 10 ↓ ↓ ↓↓ |

FIG. 7B

| | | | |
|---|---|---|---|
| submitted cells | 000 00 ↓↓↓ ↓↓ ↑ starting point | 000 00 ↓↓↓ ↓↓ | 000 00 ↓↓↓ ↓↓ |
| $y_k$ for CLP=0 | 05 32 | 554 21 | 054 21 |
| $y_k$ for CLP=0+1 | 02 35 | 135 65 | 135 65 |
| accepted cells | 01 11 ↓↓ ↓↓ ↑ starting point | 011 0 ↓↓↓ ↓ | 011 0 ↓↓↓ ↓ |

$T_{0+1}=3$,  $\tau_{0+1}=5$     $T_0=6$,  $\tau_0=1$

COMPENSATED UPC/NPC ALGORITHM TO GUARANTEE THE QUALITY OF SERVICE IN ATM NETWORKS

FIELD OF THE INVENTION

The present invention relates to the usage parameter control/network parameter control (UPC/NPC) schemes to guarantee the quality of service in an asynchronous transfer mode networks.

BACKGROUND OF THE INVENTION

In ATM/B-ISDN network, each of two cell loss priorities (CLPs) having the value of 0 or 1 required for transmission of cells in ATM can be selected using the bit of CLP. This enables to define two values associated with the peak cell rate (PCR) and the cell loss ratio (CLR) as the traffic parameters uniquely specified by ITU standards. One of two values includes PCR and CLR which are associated with the stream of CLP=0 cells that means more important information, another one includes PCR and CLR which are associated with CLP=0+1 representing the whole cells, wherein CLP=0+1 cells represent CLP=0 or CLP=1 cells, and CLP=1 cells represent less important information relative to CLP=0.

FIG. 1 depicts a block diagram of UPC/NPC schemes known as the standard procedures in ITU-T. According to UPC/NPC algorithm, as illustrated in FIG. 1, a conformance test (Po) is performed for the stream of CLP=0 cells transmitted through the interfaces between the networks and the networks (NNI) or the networks and the users ($T_B$).

The conformance test for CLP=0 cells is performed to produce the conformance or non-conformance of cells. The conformable cells are passed, but the non-conformable cells are transmitted with the tag of CLP=1 by the tagging option or without that. The cells with the tag are considered as CLP=1 cells. And, CLP=0 cells allowed to be passed and CLP=1 cells with the tag by the conformance test for CLP=0 cells are added to the conventional streams of CLP=1 cells, and then the resulting cells are subject to the policing procedure in accordance with the unconditional conformance test ($P_{o+1}$) of CLP=0+1, the policing procedure being based upon the acceptable variations of cell delay and PCR for the streams of CLP=0+1 cells negotiated between the users and the networks in the communication networks. The above policing procedure utilizes the peak cell rate reference algorithm(PCRA) to determine the conformance of the incoming traffic.

FIG. 2 depict a flow chart illustrating PCRA for UPC/NPC as described in FIG. 1. The addition of the negotiated cell inter-arrival time (T=1/PCR) between the users and networks and the actual cell arrival time $a_k$ determine the reference arrival time $c_{k+1}$ of the cells at the measuring point (MP). The resultant value $y_k$ can be obtained by subtracting the substantial cell arrival time $a_k$ from the reference arrival time ($c_k$, k(variable)) of the cell. When the resultant value is not less than zero, or the transmitted cells are arrived within the reference arrival time, the resultant value $y_k$ is compared to the cell delay variation tolerance t, and thereafter cells within the tolerance t are accepted, while cells beyond tolerance t are rejected. The use of UPC/NPC scheme of FIG. 1 utilizing such PCRA result in the occurrence of a measurement phasing problem(MPP), as illustrated in FIG. 3 and FIG. 4, for examples.

Referring to FIG. 3, it is shown that ($T_0=6$, $t_0=0$) is used as the negotiation value for CLP=0 cells and ($T_{0+1}=3$, $t_{0+1}=2$) is used as the negotiation value for CLP=0+1 cells. CLR of 100% for CLP=0 cells in (a) and CLR of 0% for CLP=0 cells in (b) result from the selection of the starting point location during measuring. And, FIG. 4 shows that ($T_0=6$, $t_0=1$) is used as the negotiation value for CLP=0 cells and ($T_{0+1}=3$, $t_{0+1}=5$) is used as the negotiation value for CLP=0+1 cells, when the tagging option is employed. Here, CLR of 80% for CLP=0 cells in (a) and CLR of 60% for CLP=0 cells in (b) result from the selection of the starting point location during measuring. For an evaluation of the conformance for CLP=0 cells, as discussed previously, the cells must meet the conformance tests for CLP=0 and CLP=0+1. However, the tests are dependent on each other, thus there is a measurement phasing problem that the receiving admittance traffics in policing are changed by an initial value.

Another problem is that such MPP makes it difficult the guarantee of the negotiated CLR between the users and the networks for the streams of CLP=0 cells.

SUMMARY OF THE INVENTION

Therefore, an object of this invention is to provide a solution to such MPP and UPC/NPC method to guarantee CLR for the stream of CLP=0 cells.

The object of the invention can be accomplished by UPC/NPC method for two priorities traffics comprising the steps of: at first performing the function of UPC/NPC for the streams of CLP=0; and then the function of UPC/NPC for CLP=0+1 cells.

Based upon the conventional PCRA algorithm (Po) for the streams of CLP=0, UPC/NPC for CLP=0 is performed, and UPC/NPC for the streams of CLP=0+1 cells is implemented with CLR compensated method and the conventional PCRA algorithm ($Po_{+1}$) for the streams of CLP=0+1 cells.

More specifically, the present invention is characterized by UPC/NPC method for guaranteeing the quality of service in an asynchronous transfer mode networks including the steps of performing a conformance test for a stream of cell loss priority(CLP)=0 cells; passing a conformable cell and transmitting a non-conformable cell with a tag of CLP=1 or rejecting the non-conformable cell by a tagging option, the method comprising the steps of: a first procedure including: adding the passed CLP=0 cells and CLP=1 cells with the tag to the previous stream of CLP=1 cells; evaluating whether CLP=0+1 cells are conformable or not; ensuring to admit CLP=0 cells to the networks that pass the test regardless of the result of the conformance evaluation for CLP=0+1; and writing the number of CLP=0 cells that pass against the test for CLP=0 into a register R; and a second procedure including: rejecting the non-conformable CLP=1 cells by the conformance evaluation test for CLP=0+1 of said first procedure; and rejecting CLP=1 that pass the conformance tests by the number of the value of the register R so as to guarantee CLR for the stream of CLP=0+1 cells.

BRIEF DESCRIPTION OF THE DRAWINGS

FIG. 6 illustrates a solution of MPP when ($T_0=6$, $t_0=0$) is used as the negotiation value for CLP=0 cells and ($T_{0+1}=3$, $t_{0+1}=2$) is used as the negotiation value for CLP=0+1 cells as the algorithm of FIG. 5 is used.

FIG. 7 illustrates a solution of MPP when the tagging option is employed and the traffic negotiation parameter is ($T_0=6$, $t_0=0$) and ($T_{0+1}=3$, $t_{0+1}=5$) for CLP=1 and CLP=0+1 cell, respectively, as the algorithm of FIG. 5.

DESCRIPTION OF A PREFERRED EMBODIMENT

Figure 5:
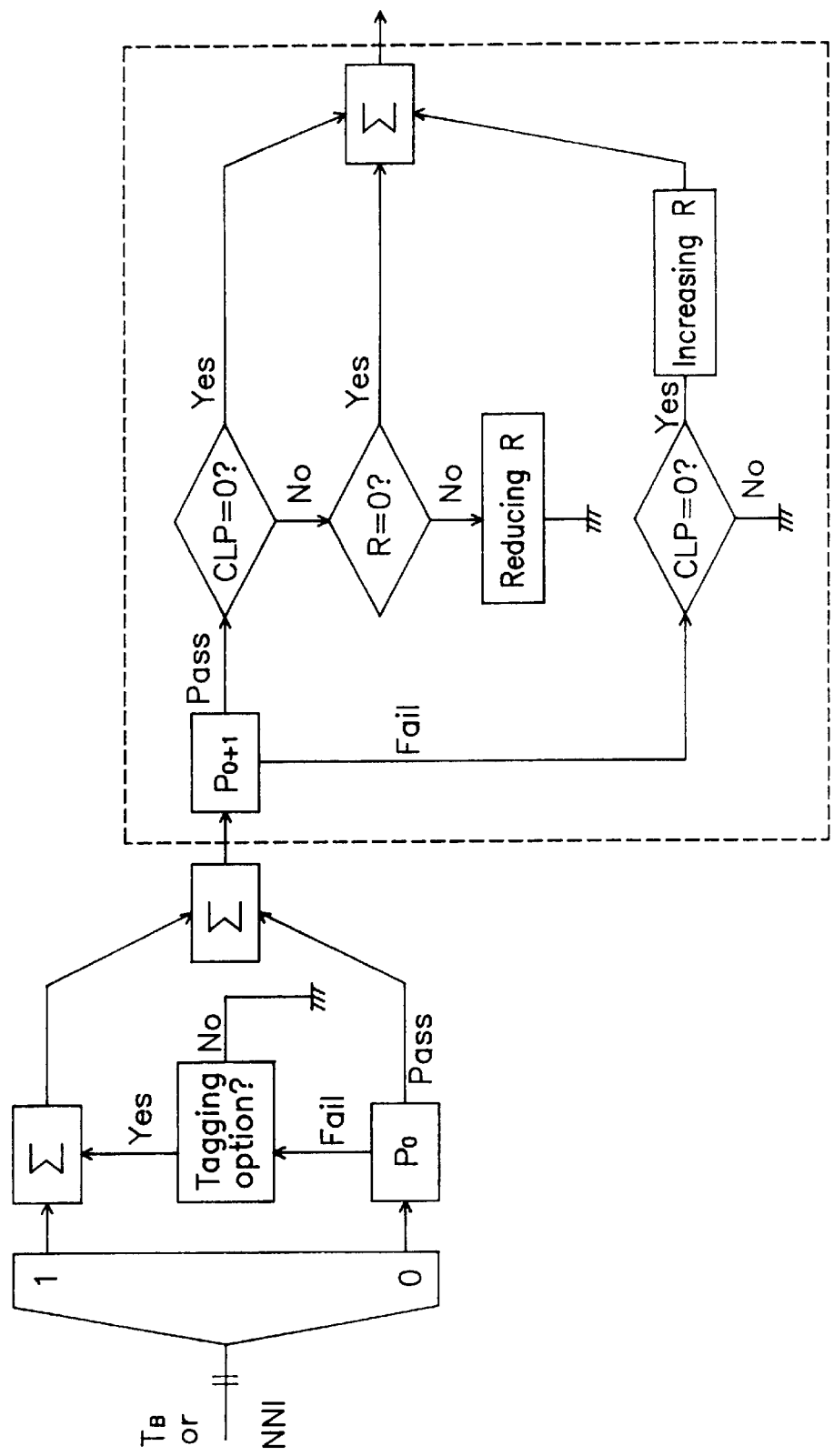
FIG. 5 illustrates a method for the compensated UPC/NPC to guarantee the cell loss ratio of ATM cells in accordance with the present invention.

The present invention will now be described with reference to the accompanying drawing figures. Referring to FIG. 5, there is illustrated a method for the compensated UPC/NPC in accordance with the present invention proving a solution to MPP encountered during policing in ATM networks and guaranteeing the cell loss ratio.

The present invention employing the conventional UPC/NPC schemes further comprises a counter register, which ensure to guarantee the cell loss ratio for CLP=1 and CLP=0+1 cells, as explained herein below in reference to FIG. 5.

Figure 1:
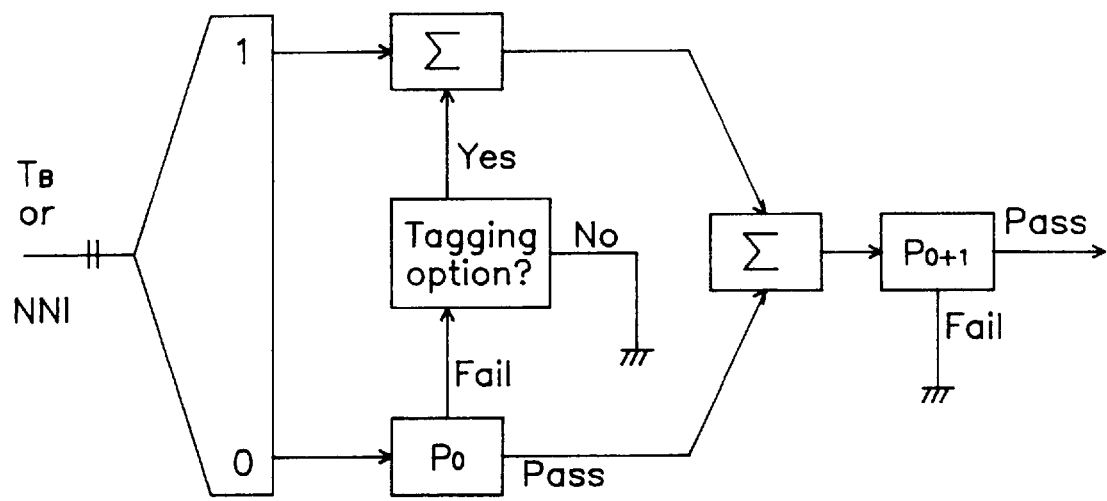
FIG. 1 depicts a block diagram of UPC/NPC schemes known as the standard procedures in ITU-T.
Figure 2:
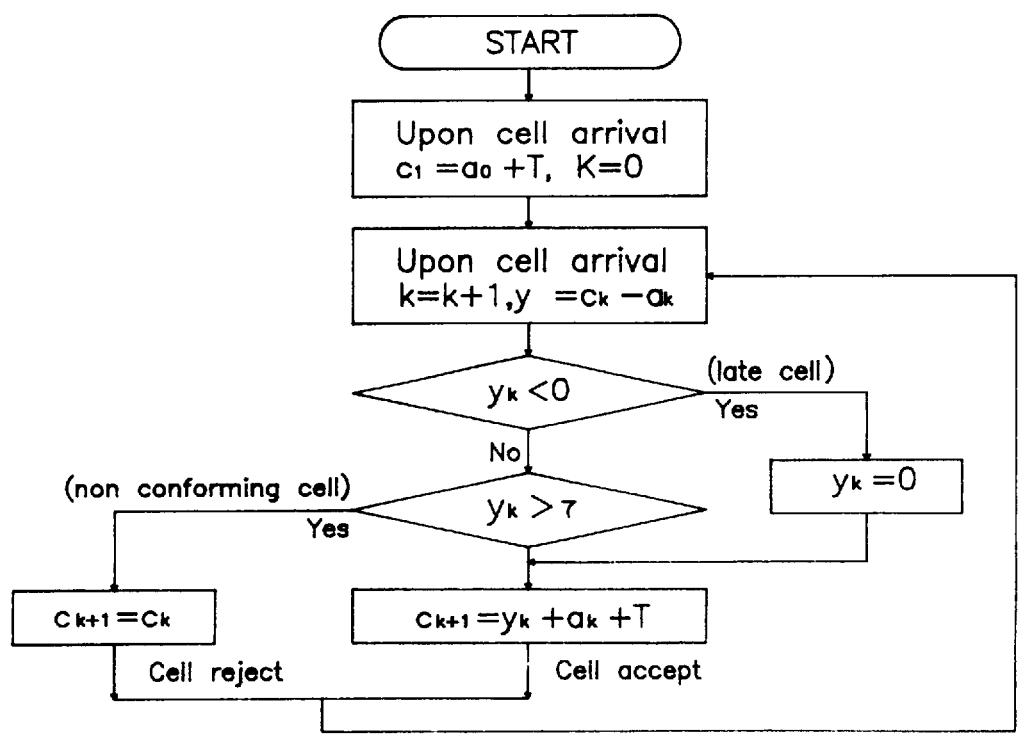
FIG. 2 depict a flow chart illustrating PCRA for UPC/NPC as described in FIG. 1.
Figure 3A:
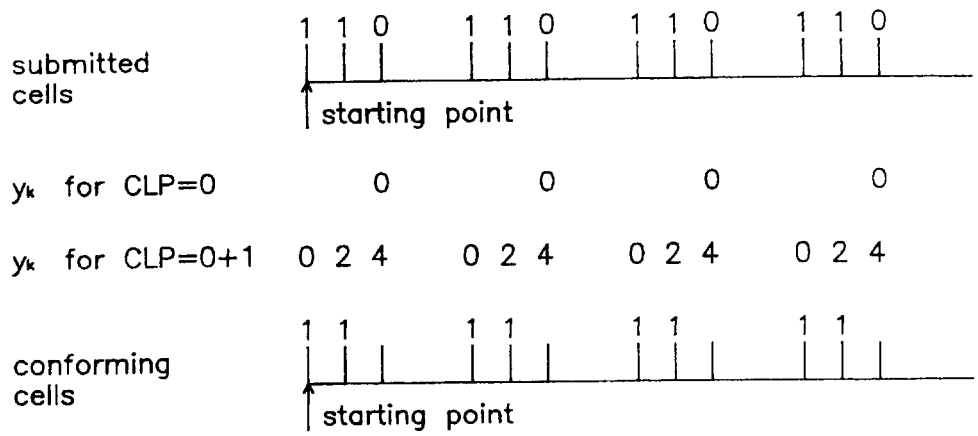
FIG. 3 illustrates that when ($T_0=6$, $t_0=0$) is used as the negotiation value for CLP=0 cells and ($T_{0+1}=3$, $t_{0+1}=2$) is used as the negotiation value for CLP=0+1 cells as the algorithm of FIG. 1 is used, MPP occurs.
Figure 3B:
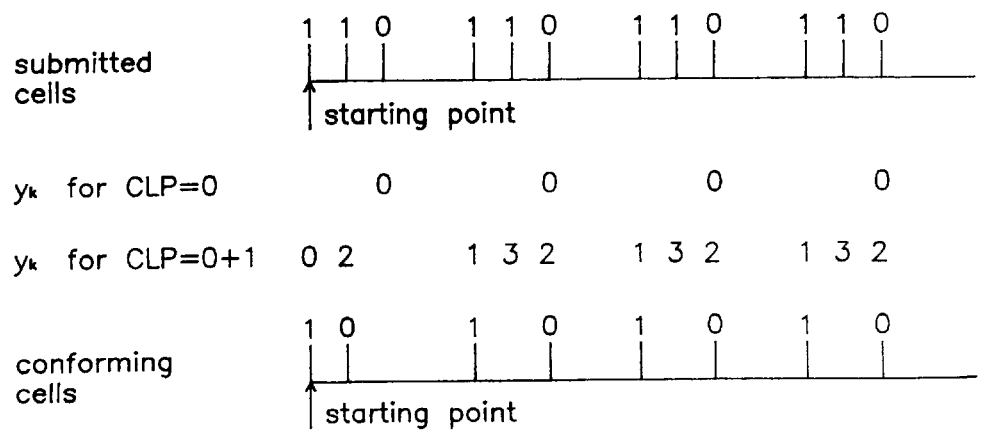
Figures 4A, 4B:
FIG. 4 illustrates MPP when the tagging option is employed and the traffic negotiation parameter is ($T_0=6$, $t_0=1$) and ($T_{0+1}=3$, $t_{0+1}=5$) for CLP=1 and CLP=0+1 cell, respectively, as the algorithm of FIG. 1.

FIG. 5 depicts a block diagram of UPC/NPC scheme containing the block in accordance with the preferred embodiment, as represented by the portion in the broken line on the drawing. For the purpose of implementing the mechanism of UPC/NPC, a register R as shown in drawing is introduced to represent the number of cells which are determined to be conformable by the test (Po) for CLP=0 and to be non-conformable by the test for CLP=0+1. The tested CLP=0 cells are added to the streams of CLP=1 cells as shown in FIG. 1, and then the conformance test for CLP=0+1 cells are performed. When cells are determined to be non-conformable by the conformance test for said CLP=0+1 cells, the bit of CLP is checked. If the checked bit is a logic 1, the cell is rejected. But, if the checked bit is a logical 0, the cell is passed and the register R is incremented by 1. This is because the cell having CLP bit value of 0 has already been passed according to the conformance test for CLP=0 cells. Thus, an admittance of the cell to the networks is guaranteed. Such an admittance of CLP=0 cells causes the content of the register R to be incremented so as to thereby represent the number of CLP=0+1 cells excessively admitted, based on the result of the conformance test for CLP=0+1 cells.

The resulting content of the register R is used to reject CLP=1 cells determined to be conformable by the conformance test for CLP=0+1 cells, thereby to adjust the whole number of CLP=0+1 cells, which are admitted by the operations of UPC/NPC, with the whole number of CLP=0+1 cells suitable for the traffic negotiation. Therefore, the value of the register R is used to determine the admittance of the passed CLP=0+1 cells from the test. That is, if the content of register R is zero, the admittance is allowed by UPC/NPC. But, if the content of the register R is not zero, the cells of CLP=1 are rejected. The rejection of CLP=1 cells decrements the content of the register R one-by-one.

The above descriptions will be further discussed with reference to FIG. 1. At first, the conformance test for the streams of CLP=0 cells is performed, and thereafter the conformable cells are passed, but the non-conformable cells are transmitted with the tag of CLP=1. The cells with the tag are considered as CLP=1 cells. CLP=0 cells allowed to be passed and CLP=1 cells with the tag for CLP=0 cells are added to the previous streams of CLP=1 cells, and then the resulting cells are subject to the conformance test.

While the conventional UPC/NPC method includes the step of policing in accordance with unconditional conformance test for CLP=0+1 cells, the new UPC/NPC in accordance with this invention guarantees the admittance of CLP=0 cells that pass the test for CLP=0 to the networks regardless of the result of the conformance test for CLP=0+1 cells. Also, the number of the passed CLP=0 cells regardless of the conformance test for CLP=0+1 cells as mentioned are written into the register R. CLP=1 cells being non-conformable by the conformance test for CLP=0+1 are not allowed to be admitted into the network, and after testing CLP=1 cells by the value of the register R, the passed cells are rejected to guarantee CLR for the streams of CLP=0+1 cells.

Thereby, both CLR for the streams of CLP=0 cells having the meaningful information and CLR for the streams of CLP=0+1 cells as the whole cells are guaranteed.

FIG. 6 and 7 illustrate an example that solves MPP by applying the compensated UPC/NPC in accordance with the invention and guarantees CLR for the stream of CLP=0 cells.

With reference to FIG. 6, when ($T_0=6$, $t_0=0$) is used as the negotiation value for CLP=0 cells and ($T_{0+1}=3$, $t_{0+1}=2$) is used as the negotiation value for CLP=0+1 cells, the invention constantly provides CLR of 0% for the streams of CLP=0 cells over the conventional schemes.

With reference to FIG. 7, when the tagging option is employed, it can be found that CLR for the streams of CLP=0 cells is usually 60%, in case that ($T_0=6$, $t_0=1$) is used as the negotiation value for CLP=0 cells and ($T_{0+1}=3$, $t_{0+1}=5$) is used as the negotiation value for CLP=0+1 cells.

According to the present invention, during the traffic negotiation in which two PCR are defined in ATM networks, MPP for the streams of CLP=0 cells and CLP=0+1 cells can be solved and CLR for the stream of CLP=0 cells is guaranteed.

What is claimed is:

1. UPC/NPC method for guaranteeing the quality of service in an asynchronous transfer mode networks including the steps of performing a conformance test for a stream of cell loss priority(CLP)=0 cells; passing a conformable cell and transmitting a non-conformable cell with a tag of CLP=1 or rejecting the non-conformable cell by a tagging option, the method comprising the steps of:

a first procedure including:
adding the passed CLP=0 cells and CLP=1 cells with the tag to the previous stream of CLP=1 cells;
evaluating whether CLP=0+1 cells are conformable or not;
ensuring to admit CLP=0 cells to the networks that pass the test regardless of the result of the conformance evaluation for CLP=0+1; and
writing the number of CLP=0 cells that pass against the test for CLP=0 into a register R; and a second procedure including:
rejecting the non-conformable CLP=1 cells by the conformance evaluation test for CLP=0+1 of said first procedure; and
rejecting CLP=1 that pass the conformance tests by the number of the value of the register R so as to guarantee CLR for the stream of CLP=0+1 cells.

2. The method according to claim 1, characterized by that the second procedure guarantees CLR for CLP=0 cells.

* * * * *